July 22, 1969  R. FORTIER  3,457,159
APPARATUS FOR PRODUCING OZONE
Filed Dec. 19, 1966
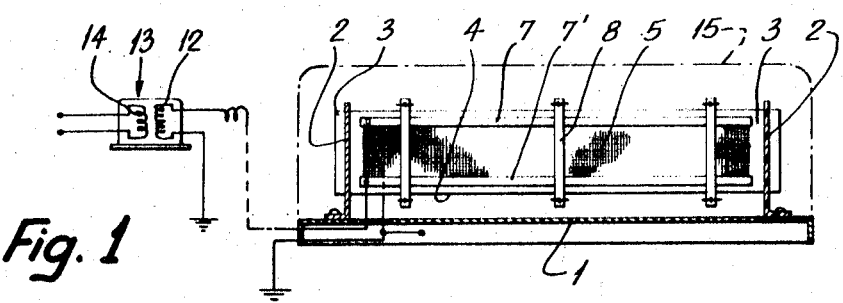
Fig. 1
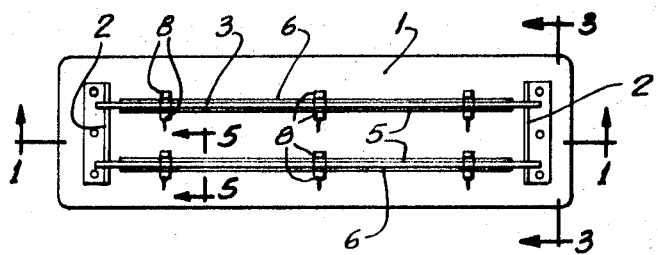
Fig. 2
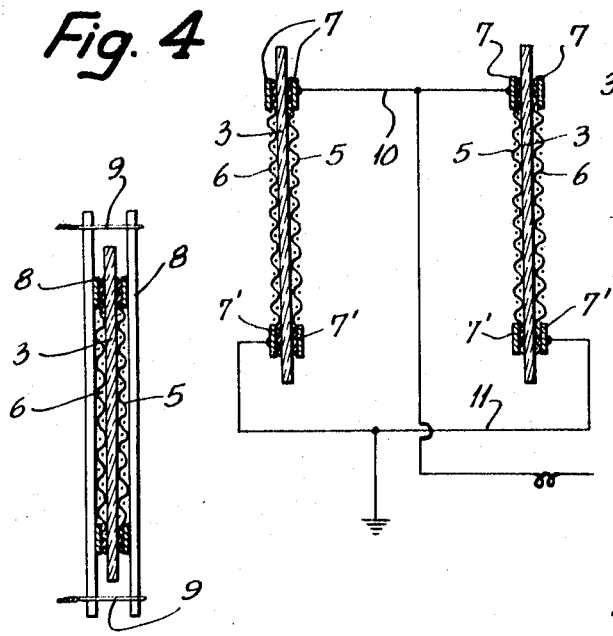
Fig. 4
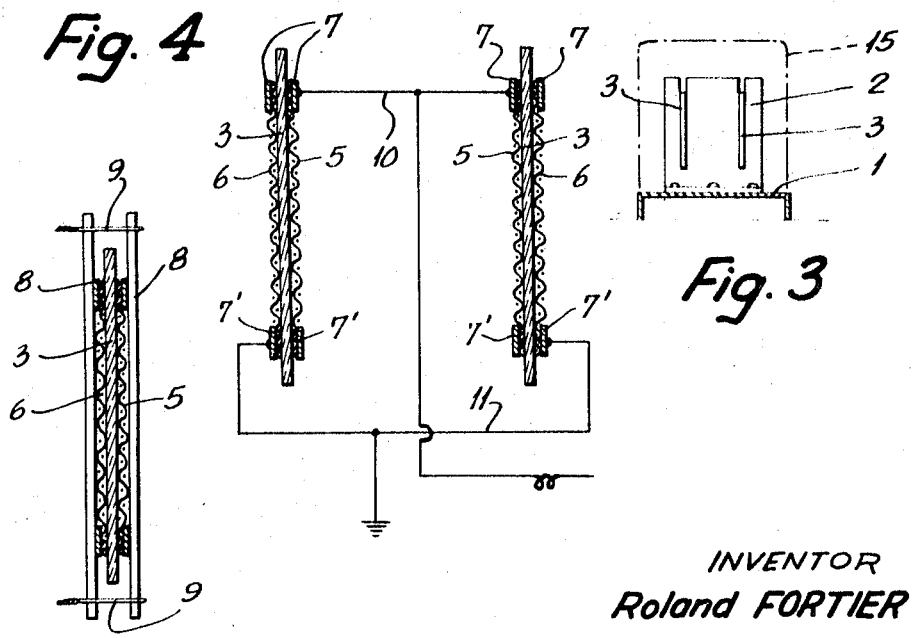
Fig. 3
Fig. 5
INVENTOR
Roland FORTIER
Pierre Lespérance
AGENT

United States Patent Office 3,457,159
Patented July 22, 1969

3,457,159
APPARATUS FOR PRODUCING OZONE
Roland Fortier, Thetford Mines, Quebec, Canada, assignor to Climabec Inc., North Thetford Mines, Quebec, Canada
Filed Dec. 19, 1966, Ser. No. 603,033
Int. Cl. B01k 1/00
U.S. Cl. 204—313                                   5 Claims The present invention relates to an apparatus producing mainly ozone for purifying air and eliminating bad odors.

The general object of the present invention resides in the provision of an ozone generator of the character described, which is of relatively simple and inexpensive construction, which takes up a minimum of room compared to the quantity of ozone and of other purifying gases produced by the apparatus.

Another object of the present invention resides in the provision of an apparatus of the character described, which can be made in a small size so as to be portable, or which can have large dimensions and, consequently, a large capacity for treating a large air volume.

Other objects of the present invention will become clearer by referring to the description and to the annexed drawings, in which:

FIGURE 1 is a longitudinal section of the apparatus, taken along line 1—1 of FIGURE 2;

FIGURE 2 is a top plan view;

FIGURE 3 is a cross-section taken along line 3—3 of FIGURE 2;

FIGURE 4 is a section, on an enlarged scale, of the two electrode assemblies and also showing the manner of electrically connecting the electrodes of each pair; and FIGURE 5 is a cross-section, on an enlarged scale, taken along line 5—5 of FIGURE 2.

In the drawings, like reference characters indicate like elements throughout.

The apparatus in accordance with the invention comprises a base 1, of generally rectangular shape, made of sheet metal or other rigid material, such as glass fibre reinforced synthetic resin, and adapted to rest on a support surface in substantially horizontal position.

Supports 2 are secured at two end portions of base 1 and consist of vertical plates which are disposed transversely to the base 1, having a bent lower flange portion rivetted, or otherwise rigidly secured, to base 1.

Support plates 2 are preferably made of an electric insulating material. Each support plate 2 is provided with two vertically disposed slits to receive the ends of two glass plates 3, of generally rectangular shape, and supported in spaced parallel position with their longitudinal axis parallel to plate 1.

Glass plates 3 are laid on edge in a vertical plane and have their lower longitudinal edge 4 spaced above base 1. Each glass plate 3 supports a pair of electrodes 5 and 6 which each consists in a metallic screen made of galvanized iron or stainless steel, or copper or brass.

The mesh size of the screen is substantially similar to the mesh size of an insect screen or slightly larger. Each screen has a generally rectangular shape, but of a size slightly smaller than the associated glass plate 3, and the two screens are applied directly against the main faces of the glass plate 3 on opposite sides thereof in order to form an inside electrode 5 and an outside electrode 6.

Screens 5 and 6 are maintained flat against the glass plate 3 by means of upper and lower strips 7 and 7' longitudinally disposed along the upper and lower longitudinal edges of the electrodes 5 and 6 against the external faces of the latter.

Strips 7 and 7' are made of rigid material, such as galvanized iron, and the assembly is in turn secured flat against the glass plate by means of vertical rods 8 of electrically insulative material disposed on each side of the assembly of the glass plate 3 and electrodes 5 and 6 and strips 7 and 7'.

Rods 8 are disposed in longitudinally spaced pairs and extend outwardly from the longitudinal upper and lower edges of glass plate 3 and the protruding ends of the rods 8 are tightened one toward the other by means of a wire loop 9 surrounding the two protruding ends of the pair of rods 8 or by any other securing means.

Strips 7 and 7' make electric contact with the respective electrodes 5 and 6 over the entire length of said electrodes. The inside electrodes 5 of both pairs of electrodes are parallel-connected by means of high voltage electric wire 10, welded or otherwise electrically connected, and secured to the upper strips 7 of said inside electrodes 5. In similar manner, the external electrodes 6 of the two pairs of electrodes are parallel-connected by high voltage electric wire 11 and said wire is welded, or otherwise electrically connected, and secured to the lower strips 7' of external electrodes 6.

Wire 11 is grounded, that is, in practice, it is connected to base 1 which is in turn grounded, while wire 10 is connected to the terminal of the secondary 12 of a high voltage step-up transformer 13, the other terminal of said secondary being grounded, that is preferably connected to base 1.

Transformer 13 has its primary 14 supplied from a conventional source of alternating 110-volt current. The primary circuit of the transformer normally includes a switch, not shown, and a pilot light showing that the apparatus is operating.

Moreover, one can provide a clock controlled switch in order to start operation of the apparatus automatically during a certain period of time and at regular intervals; for instance, during ten minutes every hour depending on the amount of ozone and other purifying gases which it is desired to generate.

The secondary 12 of the transformer can furnish a voltage varying between, for example, 7,500 volts and 30,000 volts, depending on the thickness of the glass plate 3 and, consequently on the spacing between electrodes 5 and 6.

When high voltage is applied to electrodes 5 and 6, an electric discharge is produced between the two electrodes which passes through glass plate 3. This generates mostly ozone, a gas well known as a good air purifier and eliminator of bad odors.

Because the electrodes consist of screens which are disposed flat against both opposite main faces of glass plate 3, and because plates 3 are made of glass, it appears that the apparatus in accordance with the invention generates also other chemical gaseous products which assist the ozone in its power for eliminating odors. Because the electrodes are in the form of screens, it is noted that the metal wire constituting the screens has a large contact surface with the ambient air and, consequently, the quantity of ozone and other gaseous chemical compounds generated by the apparatus is very great relatively to the area of the screens forming the electrodes. Thus, the apparatus has a large output compared to its size.

In practice, the type of metal used for making the electrode depends on the specific use of the apparatus. Tests have shown that the screens constituting the electrodes are preferably made of galvanized iron wires when treating air.

When the air is to be injected into water to treat and purify said water, the electrodes are preferably made of stainless steel wires, while when the apparatus is used for treating the waste sulphur dioxide gases emanating from a paper-producing plant, copper or brass wires are preferably used for making the screen electrodes.

The apparatus in accordance with the present invention is preferably provided with a cover 15 to prevent access to electrodes 5 and 6 and glass plates 3 on base 1.

The cover 15 is provided with a great number of openings for easy gas circulation.

For certain applications, the electrode assemblies may be disposed in horizontal planes instead of vertical planes, as shown in the drawings.

While a preferred embodiment in accordance with the invention has been illustrated and described, it is understood that various modifications may be resorted to without departing from the scope of the appended claims.

What I claim is:

1. An apparatus for producing ozone comprising a base, supports secured to said base, a glass plate serving as a dielectric mounted between said supports and supported by the latter at its end in a position spaced from said base, an elongated metallic screen mounted flat against each main face of said glass plate, rigid metal strips in electric contact with the two longitudinal edges of said screen and serving to maintain said screen flat against said glass plate, pairs of opposite rigid rods, made of electrically insulative material, applied transversely against said metal strips on each side of said glass plate, said rods protruding outwardly from said glass plate at both their ends and means for securing the protruding ends of said rods together to tighten said strips and screens flat against said glass plate, and a source of electricity at high voltage, the terminals of which are electrically connected to said metal strips in order to produce an electric discharge between said screens, passing through said glass plate.

2. An apparatus as claimed in claim 1, wherein said screens are composed of wires made of galvanized iron.

3. An apparatus as claimed in claim 1, wherein said screens are composed of wires made of stainless steel.

4. An apparatus as claimed in claim 1, wherein said screens are composed of wires made of copper.

5. An apparatus as claimed in claim 1, wherein said base is made of synthetic resin and further including a cover for said base and said electrode assemblies, also made of synthetic resin.

References Cited

UNITED STATES PATENTS

| | | | |
|---|---|---|---|
| 788,557 | 5/1905 | Sahlström | 204—317 |
| 1,396,222 | 11/1921 | Lindemann | 204—313 |
| 1,793,799 | 2/1931 | Hartman | 204—176 |
| 3,365,383 | 1/1968 | Blair | 204—321 |

ROBERT K. MIHALEK, Primary Examiner

U.S. Cl. X.R.

23—2